United States Patent [19]

Ben-Arie

[11] Patent Number: 4,911,200
[45] Date of Patent: Mar. 27, 1990

[54] CONTROL OF EXCESSIVE FLUID FLOW

[76] Inventor: Reuben Ben-Arie, 19 Ridge Rd., Cresskill, N.J. 07626

[21] Appl. No.: 275,931

[22] Filed: Nov. 25, 1988

[51] Int. Cl.$^4$ .............................................. F16K 31/02
[52] U.S. Cl. ..................................... 137/486; 137/495; 137/624.12; 137/487.5
[58] Field of Search ...................... 137/624.11, 624.12, 137/487.5, 486, 459, 460, 495, 456

[56] References Cited

U.S. PATENT DOCUMENTS

| | | | |
|---|---|---|---|
| 3,723,987 | 3/1973 | Barone | 340/242 |
| 3,748,656 | 7/1973 | Gray | 340/240 |
| 4,180,088 | 12/1979 | Mallett | 137/486 X |
| 4,249,565 | 2/1981 | Brust | 137/487.5 X |
| 4,297,686 | 10/1981 | Tom | 340/604 |
| 4,324,268 | 4/1982 | Jacobson | 137/312 |
| 4,488,567 | 12/1984 | Grant | 137/78.1 |
| 4,589,435 | 5/1986 | Aldrich | 137/624.11 X |
| 4,675,541 | 6/1987 | Peters | 137/624.12 X |
| 4,735,231 | 4/1988 | Jacquet | 137/486 X |

Primary Examiner—Alan Cohan
Attorney, Agent, or Firm—James & Franklin

[57] ABSTRACT

Means are provided for monitoring water flow to a dwelling or the like and shutting off the flow if it exists for an abnormal period of time, the system being readily adjustable to adapt itself to different considerations of abnormality depending upon time of day, time of year, presence or absence of occupants in the dwelling, and the like.

7 Claims, 3 Drawing Sheets

CONTROL OF EXCESSIVE FLUID FLOW

The present invention relates to a system for controlling the supplying of fluid such as water to a work station such as a dwelling in order to obviate undesirable effects of excessive fluid supply, such as wastage, flooding and water damage. The invention will be here specifically disclosed in connection with the supplying of water to a household dwelling, but it will be understood that this is by way of exemplification only, and that the invention is applicable to supplying of fluid of any type to any work station where controlling excessive fluid flow and/or eliminating flooding or wastage is important.

Water is supplied to homes from an external source such as a water main while the water is under considerable pressure, so that, when a faucet is opened in the home, water will flow out from the faucet. The pressure of the water in the main must be sufficient to force the water upwardly to the highest operative level of the dwelling, and hence the entire water system in the dwelling contains water at an appreciable pressure.

Water will flow from a faucet for as long as that faucet is open, and this often presents a problem. One may forgetfully walk away from an open faucet, and water will then flow until the faucet is closed, which may be hours or even weeks later. The attendant waste of water is undesirable, but there can also be far more serious consequences. If the water flows into a sink and the outlet from the sink is or becomes clogged, water will fill the sink and overflow onto the floor and then, if the flow continues long enough, through the building, damaging everything in its path-flooring, furniture, carpeting and walls-and may even cause short circuits of electrical wiring which in turn can cause fire. Comparable dire effects can result if one of the water pipes, such as one hidden from view within a wall, breaks, or if joints between pipe lengths develop serious leaks, and these emergencies are particularly sinister because they can exist and continue even while the occupant of the dwelling is present and attentive.

Hence there is a need for detecting excessive water use and automatically taking steps to terminate that excessive use. However, what is excessive at one time or under one circumstance may not be excessive at other times and under other circumstances. For example, expected water consumption is a function of the type of houshold involved-bachelor quarters and a large and growing family will use radically different amounts of water at different times. When the occupant of a dwelling is present, and during certain portions of the day when, for example, kitchen or bathroom activities are to be expected, water consumption over a reasonably substantial continuous period of time may be expected, whereas at other times during the day when the occupant is present, normal water use would involve only short continuous periods of time. When the occupant is at work or on vacation little or no continuous water use would be expected over periods of time corresponding to the existing life situation.

What is needed, and what this invention provides, is a flexible system that can readily be controlled to adapt itself to different usage requirements and, depending upon its particular adjustment, to automatically cut off the supply of water to a dwelling (or to any predetermined part or parts thereof) when water has been supplied for a length of time greater than that which the system is adjusted to tolerate at that hour or day, for example. To that end a device is inserted in the fluid supply line which senses when fluid is being supplied therethrough, and that sensor actuates a control system which measures the time duration of substantially uninterrupted fluid flow and in turn actuates a shutoff valve in the fluid supply line to terminate fluid supply when fluid flow has been continuous for a length of time in excess of that for which the system is set. Because of the fact that, as explained above, what constitutes excessive fluid flow duration varies with time and circumstance, the system is provided with programmable means for taking those variations into account and thus, for example, permitting fluid flow for only a very short period of time during nighttime hours or when the occupants are absent and permitting longer fluid flow without termination at other times. Once fluid flow has been terminated by the system it remains terminated until the system is reset, and it indicates its flow-terminated status so as to advise the occupant that something untoward has happened, enabling him to investigate the situation and not reset the system and turn the water back on until it is proper to do so, either because the problem has been resolved or so that the nature of the problem can be ascertained. All of the control and indicating features are preferably provided on a single panel readily accessible to and manipulable by the occupant of the dwelling.

To the accomplishment of the above, and to such other objects as may hereinafter appear, the present invention relates to a protective system for use in combination with a system of supplying fluid to a dwelling or the like, as defined in the appended claims and as described in this specification, taken together with the accompanying drawings in which:

Figure 1:
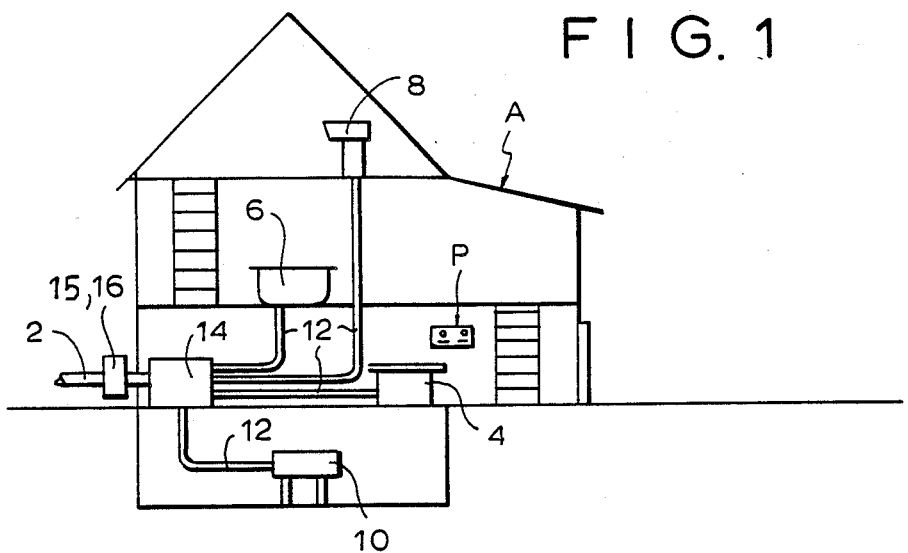
FIG. 1 is a diagrammatic view of an exemplary water supply system for a dwelling.

By way of example, this invention is illustrated as controlling the flow of water from a pipe 2 adapted to be connected to an external water main to such work stations as a kitchen sink 4, a bathtub 6, a wash basin 8 and a laundry tub 10 in various locations within a dwelling designated A. Each of those work stations 4-10 are connected to the pipe 2 by individual pipes 12, in turn connected to a distribution center 14. Whenever water is drawn from any of the work stations 4-10, or at any time that water escapes from any of the pipes 12 through breaks, leaks in joints, or whatever, fluid flows through the pipe 2, but when there are no leaks and all of the outlets are turned off there is no flow of fluid through the pipe 2. Therefore sensing whether or not fluid is flowing in pipe 2 is in effect sensing whether water is being consumed within the dwelling A, whether by way of constructive use, waste, or leak.

Figure 2:
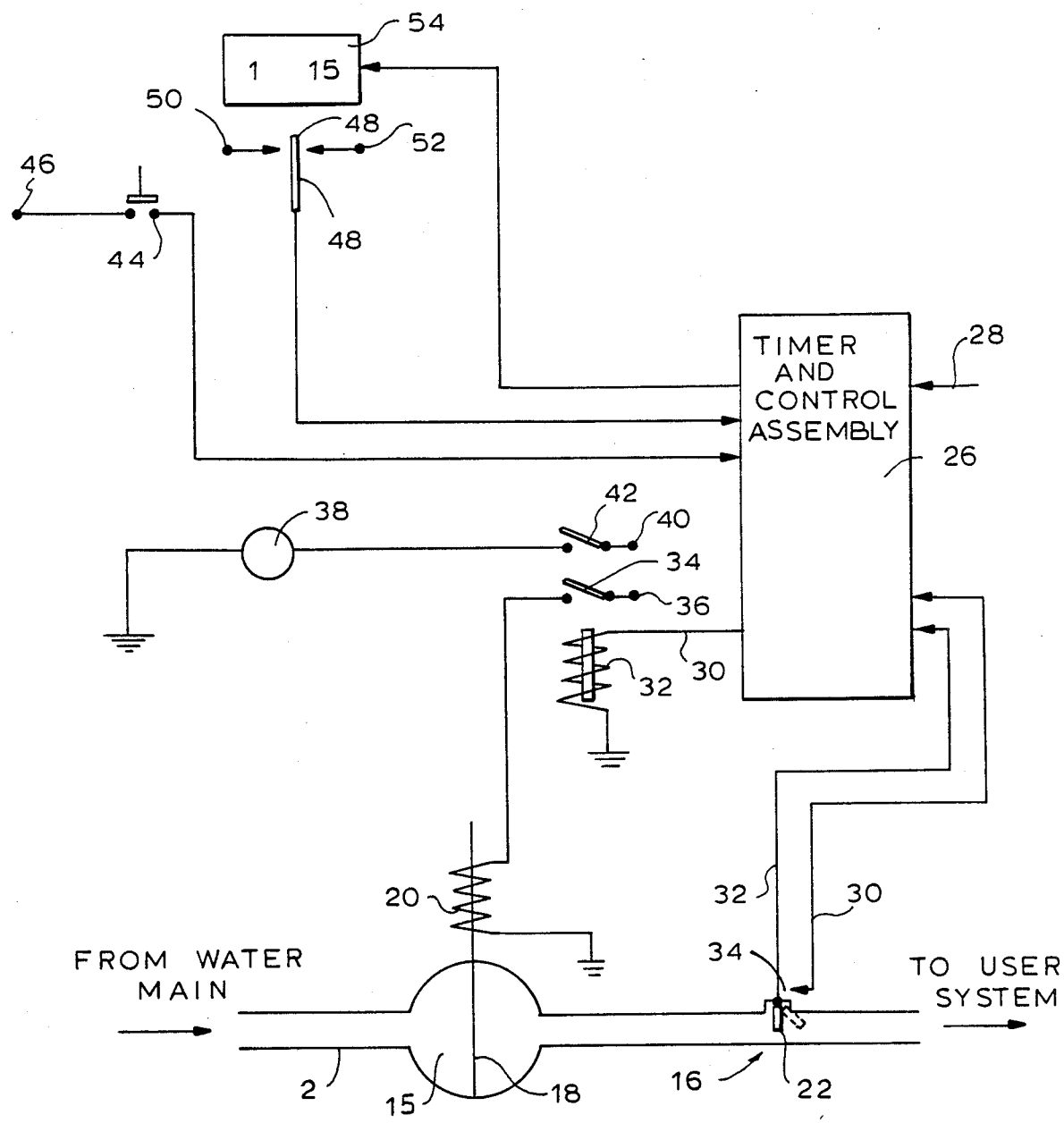
FIG. 2 is a block diagram of the protective system of the present invention, showing the flow sensor and on-off valve installed in a fluid supply line and also schematically showing the various control elements of the system of the present invention.

As indicted in FIG. 2, inserted in pipe 2, either as separate entities, as schematically indicated, or as part of a single structural combination, are an on-off valve 15 and a flow-sensing electric switch 16. The valve 15 is preferably normally closed, as indicated by the down position of the schematically shown valve element 18, that element being lifted to valve-open position, permitting fluid flow through the valve 15, upon energization of solenoid 20. Valves of this type are well known.

The flow switch 16 is also a standard piece of equipment, usually comprising a paddle 22 disposed in the pipe 2, normally assuming a vertical position, as shown in solid lines, but mounted so as to be pushed into inclined position, shown in broken lines, when fluid is flowing through the pipe 2, and the paddle 22 is operatively connected to a switch 24 which, when the paddle 22 is vertical is open, and when the paddle 22 is pushed to its inclined position is closed. One type of readily available flow switch usable in this fashion is that sold by McDonnell & Miller under the designation FS4-3 Series.

As schematically illustrated in FIG. 2, the system comprises a timer and control assembly 26 to which an external power source 28 is connected. The wires 30 and 32 from the switch 24 feed into the assembly 26. In order to provide fail-safe operation, the solenoid 32 is normally energized, closing the switch 34 connected between power source 36 and the solenoid 20, thus energizing the solenoid and opening the valve 15. When the timer in the assembly 26 times out energization of line 30 is interrupted, the solenoid 32 is de-energized, switch 34 opens, solenoid 20 is de-energized, and the valve 15 closes, interrupting fluid flow through the pipe 2 and into the dwelling A. When this occurs the paddle 22 will move back to its vertical position and the switch 24 will open, but the control assembly 26 will be unaffected by that, the line 30 will remain de-energized and the valve 15 will remain closed.

In order to keep the user advised of the status of the control system, an indicator light 38 is provided, electrically connected to a power source 40 by normally open switch 42. During standby operation of the control system, i.e., before the timer in the control assembly 26 is started, and during the time that the timer is timing, the solenoid 32 will be energized, the switch 42 will be closed, and the indicator light 38 will be illuminated, but when energization of line 30 is interrupted and the valve 15 closes, the switch 42 will also open, thus extinguishing lamp 38, thereby indicating that the system has timed out and closed the valve 15.

Once the valve 15 is closed, it will remain closed until reset button 44 is closed, that button constituting a switch connected between power source 46 and the timer and control assembly 26. Closure of the reset button 44 has the effect of restoring energization of the line 30, thus opening valve 15 and causing the indicator lamp to light, and resetting the timer.

The manual switch 48 is normally open, as indicated, but when closed connects power source 50 or 52 to the timer and control assembly 26 in order to vary the time to which the timer is set, and indicator means 54 is provided so that the user can set the timer to the particular period of time desired. Preferably two power sources 50 and 52 are provided, one effective to increase time and the other to decrease it, the switch 48 is normally in an intermediate position where no change in the timer is effected, and it can be moved into electrical connection with source 50 or source 52 depending upon whether the desired time is to be increased or decreased. The time that is set at any given moment will be the maximum expected continuous time of fluid consumption in the dwelling. As a result fluid consumption of a normal period of time will start the timer timing, cessation of fluid flow will be detected by the flow switch 16 before the timer has timed out, the timer will automatically reset, ready for another timing, and the valve 15 will remain open. However, if fluid flow is detected continuously for a period longer than the setting of the timer, the valve 15 will close, fluid flow will be interrupted, the indicator light 38 will go out, and there will be no further fluid supply to the dwelling until appropriate steps are taken.

As has been pointed out, the timer setting is usually not fixed and invariable, because expected water consumption conditions change on the basis of time, of day, and activities of the occupants of the house. Water consumption during night hours is minimal, perhaps involving only occasional toilet flushings. Water consumption during the early morning, when the family is washing and getting ready for work or school, may involve water flow over a very long period of time. Water consumption during the time that the occupants are either at work or at school is minimal. All of these factors may vary with the day of the week, since there is neither work nor school on Saturdays or Sundays. When the family is away on vacation water consumption at any time should be minimal.

Figure 5:
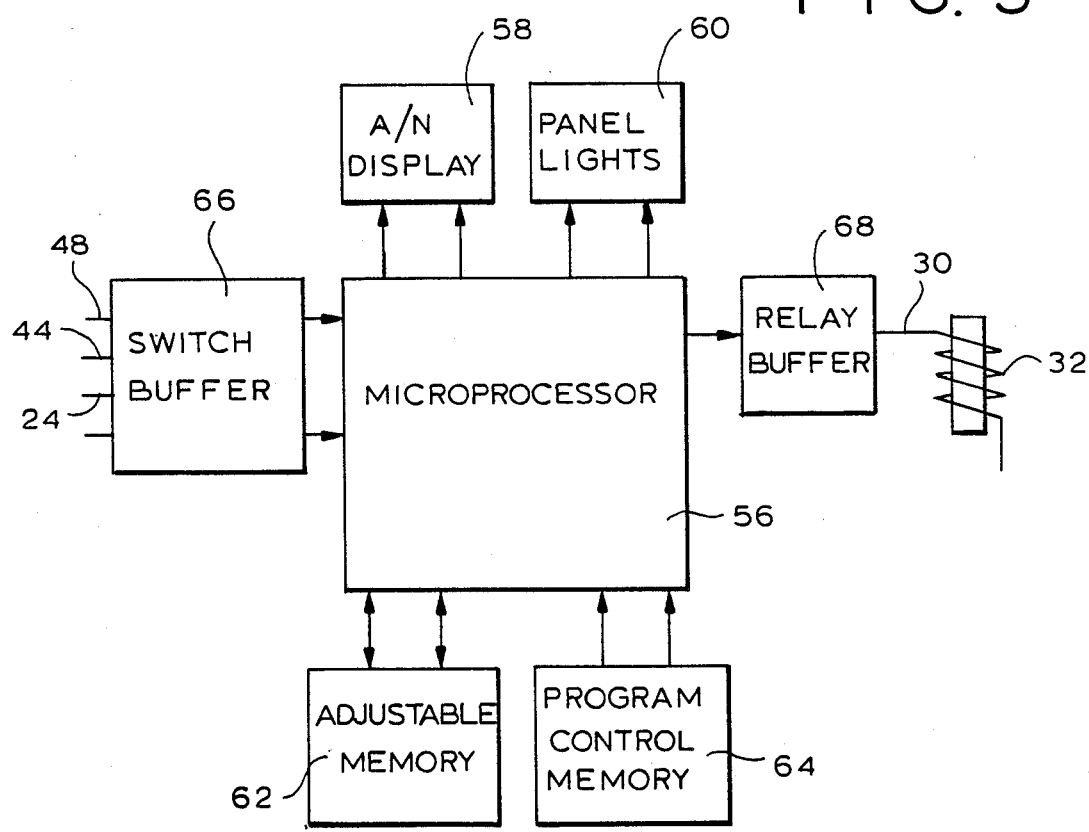
FIG. 5 is a block diagram of the programmable portion of the system of the present invention.

In order for a control system to function adequately it should be capable of accommodating itself to these variations in supervisory requirements. To that end, and as schematically disclosed in FIG. 5, the timer and control assembly 26 may comprise a microprocessor 56 which controls an alpha/numeric (A/N) display 58 and one or more indicator lights 60, the microprocessor functioning in conjunction with an adjustable memory 62 and a program control memory 64. Switches such as the switch 48, the reset switch 44 and the flow-sensing switch 24 feed into the microprocessor 56 through buffer 66, and the microprocessor output is fed to line 30 and solenoid 32 through relay buffer 68.

Figure 3:
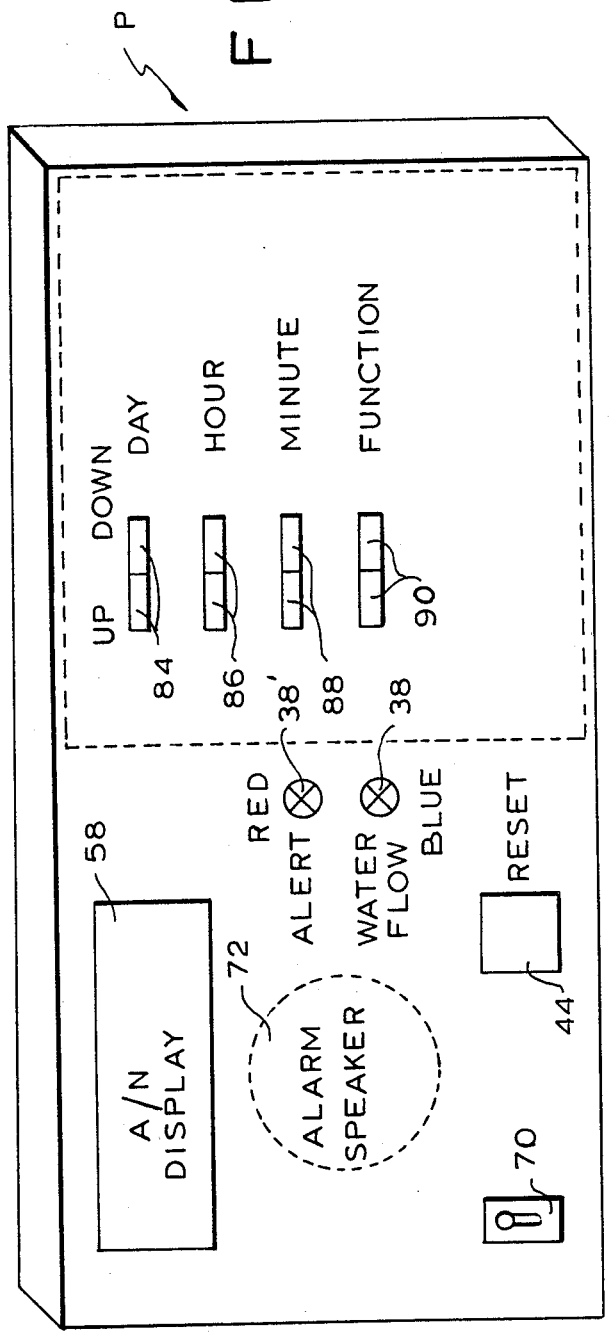
FIG. 3 is a front elevational view of a typical control panel for use in that system.
Figure 4:
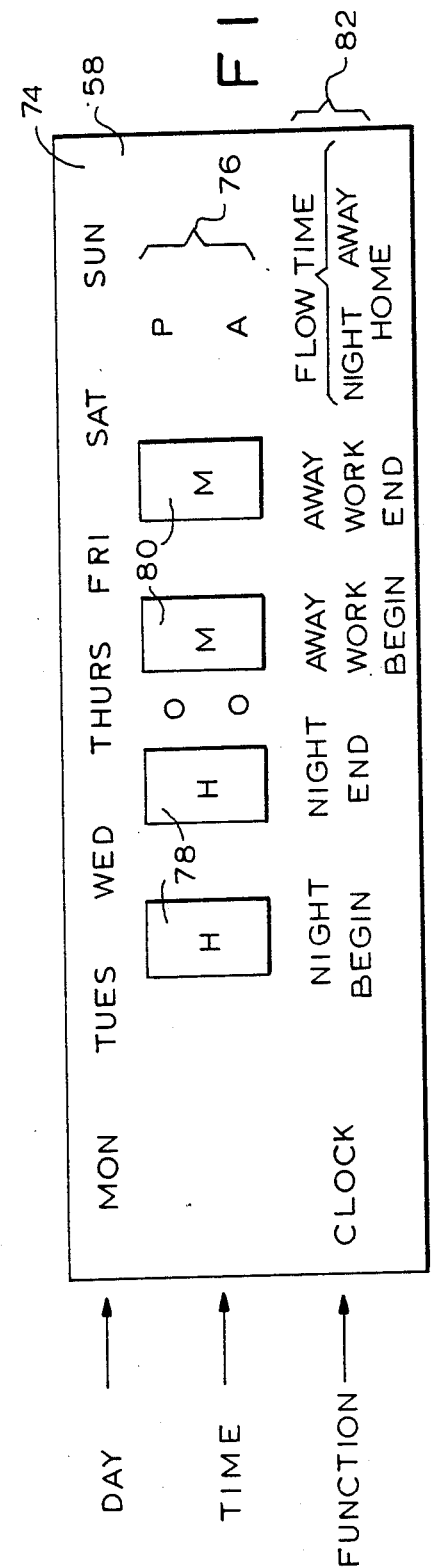
FIG. 4 is a detail view of the alpha/numeric (A/N) display on the panel of FIG. 3.

FIG. 3 represents a typical control panel P for the system of the present invention. It is provided with an on-off switch 70 for the system, the reset button 44, the bulb 38 which is illuminated during the time that water flows, and, in this embodiment, another bulb 38' which is illuminated when the system has interrupted fluid flow, the bulb 38 preferably being blue and the bulb 38' preferably being red. It is also provided with a loudspeaker 72 which produces an audible alarm when the red light 38' is illuminated. Its alpha/numeric display 58 is shown in FIG. 4. That display comprises a top line 74 of selectively illuminated indications of days of the week, an intermediate row 76 of windows 78 indicating hours and windows 80 indicating minutes, and a lower row 82 of selectively illuminated function indications, that is to say, indications of the particular parameter that is being controlled, adjusted, and/or displayed. Control of the particular indication or function selected is effected by pushbuttons on the face of the panel, one set of pushbuttons 84 controlling the "day" indication, another set 86 controlling the "hour" indication, and another set 90 controlling the "function" indication, each set of pushbuttons comprising one button for causing the indication to increase or move to the right and the other causing the indication to decrease or move to the left, as the case may be.

The "clock" function is to set the clock which measures the time of day or night. The "Night Begin" function determines the clock time when a nighttime setting of the timer is to start to be in force, and the "Night End" function represents the clock time when that nighttime timer setting is no longer to be in force. Similarly the "Away/Work Begin" and "Away/Work End" functions are for determining the clock time and, where appropriate, the day of the week when the timer settings corresponding to the residents being away or at work are to be effective. The "Flow Time-Home", "Flow Time-Night" and "Flow Time-Away" functions are the settings of the timer to correspond to the normal, nighttime or away/work situations. The time row 76 will normally indicate the time of day, but when any particular function is selected it will indicate the particular value of that function that is being set into the adjustable memory 62, thereby to enable the system to function automatically over an extended period of time—hours, days, weeks or more—in accordance with the information set into the adjustable memory 62.

It may be desirable for valve 15 to have a latching capability so as to avoid the need for continuous current flow through the solenoid 20. That same valve may also be provided with a mechanical opening lever, so that if the control system fails the valve can be manually opened to permit water flow into the dwelling.

As a result, a simple, sturdy and reliable system is provided which will not interfere with normal water usage but which will detect abnormal water usage and positively prevent either water wastage or damage from overflowing or leaks.

The individual components of the system, mechanical, electrical and computer, are all standard, readily available and well known.

While but a limited number of embodiments of the invention have been here specifically disclosed, it will be apparent that the invention is not limited thereto but that other specific embodiments may be utilized, all within the scope of the invention as defined in the following claims.

I claim:

1. In combination with a system for supplying fluid to a dwelling or the like via a fluid conduit, a protective system comprising valve means in said conduit movable between open and closed conditions, flow switch means for sensing fluid flow in said conduit and actuating a switch in response thereto, and manually adjustable control means operatively connected between said switch of said flow switch means and said valve means, said control means comprising manually settable timing means and being effective to normally maintain said valve means in open condition and to move said valve means to closed position when fluid flow in said conduit is sensed for a predetermined period of time as determined by said flow switch means and the setting of said timing means, and to thereafter normally maintain said valve closed, in which said control means additionally comprises a clock means for measuring the passage of time independently of the operation of said system, and means for programming said predetermined period of time of said timing means in accordance with the time measurement of said clock means.

2. The system of claim 1, in which said fluid flow switch means comprises a normally open switch electrically connected to said timing means and adapted to be closed when fluid flow is sensed, thereby to start said timing means, and to be open when fluid flow is not sensed.

3. The system of claim 1, in which said timing means resets to zero when the electrical connection thereto is open.

4. The system of claim 1, in which said control means comprises means for varying the effective predetermined period of time of said timing means in accordance with a predetermined time schedule, and means for manually varying said predetermined time schedule.

5. The system of claim 4, comprising means for establishing different sets of predetermined times of said timing means in accordance with predetermined time schedules, and means for manually controlling which of said sets is operative at any given time.

6. The system of claim 1, in which said control means comprises a manually accessible panel having exposed means thereon for adjusting said predetermined time of said timing means, for de-actuating, actuating and resetting said control means, and for indicating the status of said system, and means for establishing one or more of said predetermined time schedules.

7. The system of claim 5, in which said control means comprises a manually accessible panel having exposed means thereon for adjusting said predetermined time of said timing means, for de-actuating, actuating and resetting said control means, and for indicating the status of said system, and means for establishing one or more sets of said predetermined time schedules and the clock times for making them operative.

* * * * *